2,764,582

4,4'-DIAMINO-STILBENE COMPOUNDS

Heinrich Gold, Opladen, and Siegfried Petersen, Leverkusen, Germany, assignors to Farbenfabriken Bayer Aktiengesellschaft, Leverkusen, Germany, a corporation of Germany No Drawing. Application November 3, 1953, Serial No. 390,082

Claims priority, application Germany August 28, 1950

7 Claims. (Cl. 260—249.6)

The present invention relates to new 4,4'-diaminostilbene compounds and to a process of producing them.

This application is a continuation-in-part of our application Serial No. 241,692, filed August 13, 1951, entitled "4,4-Diamino-Stilbene-Compounds."

The 4,4'-diaminostilbene compounds of the present invention may be obtained by reacting one mol of 4,4'-diamino-stilbene or its derivatives containing sulfonic acid or carboxylic acid groups with two mols of cyanuric chloride and half a mol of an aromatic diamine, which carries at least two aromatic nuclei linked by a carbonamide group and preferably contains solubilizing groups.

Typical representatives of the new compounds correspond, for instance, to the general formula:

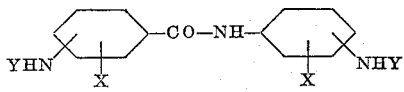

In this formula at least one X means a solubilizing group, such as for instance, a sulfonic acid or carboxylic acid group, a sulfonate or a carboxylate group, and Y represents the monovalent radical of the reaction product of 1 mol of a 4,4'-diamino-stilbene-disulfonic acid in the form of a water soluble salt and 2 mols of cyanuric chloride, said monovalent radical corresponding to the general formula:

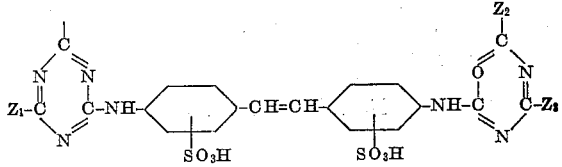

$Z_1$, $Z_2$ and $Z_3$ standing for equal or different substituents, for instance, chlorine, hydroxy groups and/or amino groups which may contain alkyl-, hydroxyalkyl- or aryl radicals.

The new compounds of the invention may be obtained in various manners, for instance, by reacting the condensation product obtained from 1 mol of 4,4'-diaminostilbene-disulfonic acid and 2 mols of cyanuric chloride with ½ mol of p-aminobenzoyl-p-phenylene-diamino-sulfonic acid. If the chlorine at the triazine nuclei is to be replaced by the hydroxyl group, the reaction product is boiled in aqueous alkali, for instance, sodium carbonate. By reacting the product with ammonia or primary or secondary amines, the chlorine at the triazine nuclei is likewise easily replaced by the corresponding amino radicals.

The compounds of the present invention may be employed, for instance, as optical bleaching agents by treating the goods to be bleached in aqueous solutions containing the new compounds. The novel compounds may also be incorporated in detergents or may be added to the washing liquors.

The novel compounds may advantageously be used for increasing the white effects of undyed materials of any kind, especially textiles, ordinary and special paper, for instance photographic paper, straw for hats, leather, woods, soaps etc.; also dyed materials are improved by the novel compounds which in many cases effect a clearer and brighter shade. For producing improved discharges on dyed textiles the compounds of the invention may either be incorporated in the dyestuff or may be added to the dyeing liquor or finally to the discharge paste.

The novel compounds of the present invention display when used as bleaching agents the advantage over the previously known optical bleaching agents that the bleaching effects obtained therewith are extraordinarily fast to washing and in many cases even stable to boiling.

The invention is further illustrated by the following examples without being restricted thereto, the parts given being by weight:

Example 1

54 parts of cyanuric chloride are dissolved in 350 parts of warm acetone and the resulting clear solution is poured into a mixture consisting of 400 parts of ice and 300 parts of water. 95 parts of the sodium salt of 4,4'-diamino-stilbene-2,2'-disulfonic acid dissolved in 400 parts of water and 15 parts of sodium carbonate dissolved in 100 parts of water are simultaneously added with stirring so that the reaction mixture is always acid to Congo. The temperature is kept at 0° C. After the 4,4'-diamino-stilbene-2,2'-disulfonic acid has been completely reacted 14 parts of aniline are added, the reaction mixture is slowly heated to 25–30° C. while keeping the reaction mixture weakly acid to neutral by dropping in 75 parts of 10% caustic soda solution. To this suspension of the sodium salt of 4-[2-chloro-4-phenylamino-1,3,5 - triazyl - (6)] - 4' - [2,4 - dichloro - 1,3,5-triazyl-(6)] - diamino-stilbene - 2,2'-disulfonic acid, 25 parts of the sodium salt of 2-(4'-amino-benzoyl-amino)-5-amino-benzene-sulfonic acid, dissolved in 200 parts of water are added, the reaction mixture is heated to 60° C. and kept neutral to weakly acid by adding 75 parts of 10% sodium carbonate solution. Thereupon 250 parts of 20% ammonia are added, the acetone is distilled off and the reaction mixture is heated to 95–100° C. for a further two hours. 600 parts of sodium chloride are added at 95–100° C. and the precipitate formed is separated by filtering at 50° C. After drying 140 parts of a weakly yellow powder are obtained.

Example 2

54 parts of cyanuric chloride are condensed in aqueous acetone with 95 parts of the sodium salt of 4,4'-diaminostilbene-2,2-disulfonic acid as described in Example 1, whereupon the condensation product is reacted with 16 parts of p-toluidine. To the sodium salt of 4-[2-chloro-4 - p - tolylamino - 1,3,5 - triazyl - (6)] - 4 - [2,4 - dichloro - 1,3,5 - triazyl - (6)] - diamino - stilbene - 2,2'-disulfonic acid obtained 25 parts of the sodium salt of 2 - (4' - amino - benzoyl - amino) - 5 - amino - benzene-sulfonic acid dissolved in 200 parts of water are added, the reaction mixture is heated to 60° C. and kept neutral to weakly acid by adding 75 parts of 10% sodium carbonate solution. The precipitate formed is separated by filtering. After drying 152 parts of a weakly yellow powder are obtained.

Example 3

150 parts of the end product obtained according to Example 2 are suspended in 2000 parts of water and reacted with 30 parts of monoethanolamine at 95–100° C. for two hours. 600 parts of sodium chloride are added at 95–100° C. and the precipitate formed is separated by filtering at 50° C. After drying 160 parts of a weakly yellow powder are obtained.

When replacing in the above reaction 30 parts of ethanolamine by 250 parts of a 33% aqueous solution of monomethylamine or by 230 parts of a 39.5% aqueous solution of monoethylamine, 116 parts or 104 parts respectively of a pale green-yellow powder are obtained.

*Example 4*

54 parts of cyanuric chloride are condensed in aqueous acetone with 95 parts of the sodium salt of 4,4' - diamino-stilbene - 2,2 - disulfonic acid as described in Example 1, whereupon the condensation product is reacted with 16 parts of p-anisidine. To the sodium salt of 4 - [2 - chloro-4 - p - anisylamino - 1,3,5 - triazyl - (6)] - 4 - [2,4 - di-chloro - 1,3,5 - triazyl - (6)] - diamino - stilbene - 2,2' - disulfonic acid obtained, 25 parts of the sodium salt of 2 - (4' - amino - benzoyl - amino) - 5 - amino - benzene-sulfonic acid, dissolved in 200 parts of water are added, the reaction mixture is heated to 60° C. and kept neutral to weakly acid by adding 75 parts of 10% sodium carbonate solution. Thereupon 400 parts of 10% aqueous solution of sodium carbonate are added, the acetone is distilled off and the reaction mixture is heated to 95–100° C. for a further two hours. 600 parts of sodium chloride are added at 95–100° C. and the precipitate formed is separated by filtering at 50° C. After drying 152 parts of a weakly yellow powder are obtained.

The new compounds are employed as optical bleaching agents in the following manner:

Cotton is treated at 40° C. for 15 minutes in a liquor of 1:20 containing per liter 0.04 gram of any of the above powders. The goods are subsequently rinsed and dried. The white effects of the goods thus treated are essentially improved and retained even after usual laundering several times.

If in the usual manufacture of paper 0.1–1 part of any of the above powders is added to 100 parts of sulfite cellulose in the beater, the paper obtained shows a pleasant, neutral white tint.

If yellowish white paper is treated in a solution containing per liter 0.05–0.06 gram of any of the above powders the paper shows a neutral white after rinsing and drying.

Laundering is carried out as usual by means of a detergent containing per 1 kilogram besides the usual additions 2–3 grams of any of the above powders. After rinsing and drying the laundry goods have a pure, white appearance.

We claim:

1. 4,4'-diamino-stilbene compounds of the general formula

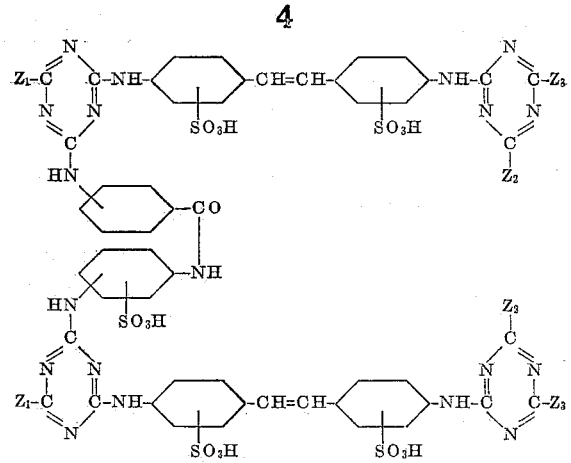

wherein $Z_1$, $Z_2$ and $Z_3$ stand each for a member of the group consisting of chlorine, the hydroxy group, the amino group, an amino group substituted by a lower alkyl radical, an amino group substituted by a lower oxalkyl radical, and an amino group substituted by an aryl radical.

2. A 4,4'-diamino-stilbene compound of the general formula of claim 1 wherein $Z_1$ stands for chlorine, $Z_2$ for the tolylamino group and $Z_3$ for chlorine.

3. A 4,4'-diamino-stilbene compound of the general formula of claim 1 wherein $Z_1$ stands for the hydroxy group, $Z_2$ for the anisylamino group and $Z_3$ for the hydroxy group.

4. A 4,4'-diamino-stilbene compound of the general formula of claim 1 wherein $Z_1$ stands for the amino group, $Z_2$ for the phenylamino group and $Z_3$ for the amino group.

5. A 4,4'-diamino-stilbene compound of the general formula of claim 1 wherein $Z_1$ stands for the monoethanolamino group, $Z_2$ for the tolylamino group and $Z_3$ for the monoethanolamino group.

6. A 4,4'-diamino-stilbene compound of the general formula of claim 1 wherein $Z_1$ stands for the monoethylamino group, $Z_2$ for the tolylamino group and $Z_3$ for the monoethylamino group.

7. Process of producing 4,4'-diamino-stilbene compounds which comprises reacting one mol of a 4,4'-diamino-stilbene-disulfonic acid with two mols of cyanuric chloride and half a mol of an aromatic diamine of the general formula

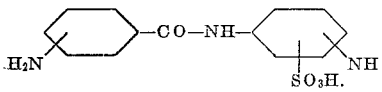

No references cited.